(12) United States Patent
Koyama et al.

(10) Patent No.: US 8,261,755 B2
(45) Date of Patent: Sep. 11, 2012

(54) FUEL INJECTION SYSTEM OF COMPRESSION IGNITION INTERNAL COMBUSTION ENGINE

(75) Inventors: Takashi Koyama, Susono (JP); Hisashi Ohki, Numazu (JP); Masahiro Nagae, Aichi-ken (JP); Kiyoshi Fujiwara, Susono (JP); Tomohiro Kaneko, Mishima (JP); Takafumi Yamada, Susono (JP); Hajime Shimizu, Susono (JP); Seiji Ogura, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 293 days.

(21) Appl. No.: 12/597,723

(22) PCT Filed: Apr. 28, 2008

(86) PCT No.: PCT/JP2008/058511
§ 371 (c)(1),
(2), (4) Date: Oct. 26, 2009

(87) PCT Pub. No.: WO2008/133355
PCT Pub. Date: Nov. 6, 2008

(65) Prior Publication Data
US 2010/0043747 A1 Feb. 25, 2010

(30) Foreign Application Priority Data

Apr. 27, 2007 (JP) ................... 2007-118573

(51) Int. Cl.
*F02M 59/36* (2006.01)
*F02B 3/00* (2006.01)
(52) U.S. Cl. .................... 132/299; 123/300; 123/458
(58) Field of Classification Search .................. 123/299, 123/300, 304, 305, 27 R, 27 GE, 456, 457, 123/458, 447, 463, 510, 511, 512, 495, 496, 123/501, 502, 454, 445, 453; 701/103, 104, 701/105
See application file for complete search history.

(56) References Cited

U.S. PATENT DOCUMENTS

| 5,231,962 | A | 8/1993 | Osuka et al. |
| 6,240,896 | B1 * | 6/2001 | Ueda et al. ..................... 123/299 |
| 6,286,484 | B1 * | 9/2001 | Niethammer et al. ........ 123/447 |
| 6,390,058 | B1 * | 5/2002 | Takahashi et al. ............ 123/299 |
| 6,722,345 | B2 * | 4/2004 | Saeki et al. .................. 123/435 |
| 6,912,992 | B2 * | 7/2005 | Ancimer et al. .............. 123/299 |

(Continued)

FOREIGN PATENT DOCUMENTS

EP 0 953 756 A2 11/1999

(Continued)

*Primary Examiner* — Stephen K Cronin
*Assistant Examiner* — Raza Najmuddin
(74) *Attorney, Agent, or Firm* — Sughrue Mion, PLLC

(57) ABSTRACT

An object of the present invention is to control the discharge amount of unburned fuel components in the internal combustion engine. According the present invention, the number of times of execution of sub fuel injection is changed based on the operation range within which the operation state of the internal combustion engine falls so that the lower the engine load of the internal combustion engine is, and the lower the number of engine revolutions of the internal combustion engine is, the more the number of times of execution of sub fuel injection is increased. Furthermore, the lower the atmospheric pressure is, the lower the temperature of the cooling water of the internal combustion engine is, or the lower the temperature of the intake air of the internal combustion engine is, the more an operation range in which the number of times of execution of sub fuel injection is large is expanded to higher loads and higher revolutions.

2 Claims, 7 Drawing Sheets

U.S. PATENT DOCUMENTS

| | | | |
|---|---|---|---|
| 7,201,127 B2 * | 4/2007 | Rockwell et al. | 123/179.16 |
| 7,322,340 B2 * | 1/2008 | Ohga et al. | 123/299 |
| 7,861,686 B2 * | 1/2011 | Ogura et al. | 123/299 |
| 2003/0089334 A1 * | 5/2003 | Yomogida | 123/300 |

FOREIGN PATENT DOCUMENTS

| | | | |
|---|---|---|---|
| EP | 1 344 922 A2 | | 9/2003 |
| JP | 3265627 A | | 2/1994 |
| JP | 406074122 A | * | 3/1994 |
| JP | 06-129296 A | | 5/1994 |
| JP | 2000-018077 A | | 1/2000 |
| JP | 2001-012277 A | | 1/2001 |
| JP | 2003-269229 A | | 9/2003 |
| JP | 2003-343330 A | * | 12/2003 |

\* cited by examiner (a)

(b)

FUEL INJECTION SYSTEM OF COMPRESSION IGNITION INTERNAL COMBUSTION ENGINE

This application is the national phase application under 35 U.S.C. §371 of PCT international application No. PCT/JP2008/058511 filed on 28 Apr. 2008, which claims priority to Japanese patent application No. 2007-118573 filed on 27 Apr. 2007, the contents of which are incorporated herein by reference.

TECHNICAL FIELD

The present invention relates to a fuel injection system of a compression ignition internal combustion engine.

BACKGROUND ART

In an compression ignition internal combustion engine (which will be simply referred to as an internal combustion engine hereinafter), sub fuel injection is performed multiple times at a time prior to the main fuel injection in one combustion cycle, in some cases. Japanese Patent Application Laid-Open No. 2003-269229 describes a technology in which the number of times of execution of sub fuel injection in one combustion cycle (which will be simply referred to as the number of times of execution of sub fuel injection hereinafter) is changed according to the engine load and the number of engine revolutions of the internal combustion engine. Furthermore, Japanese Patent Application Laid-Open No. 6-129296 describes a technology in which during the starting of an internal combustion engine, the lower the temperature of the cooling water is, the larger the number of times of execution of sub fuel injection is made. Japanese Patent Application Laid-Open Nos. 2001-12277 and 2000-18977 also describe technologies pertaining to the sub fuel injection.

DISCLOSURE OF THE INVENTION

In the internal combustion engine, when the atmospheric pressure is low, when the temperature of the internal combustion engine is low, or when the temperature of the intake air of the internal combustion engine is low, fuel injected into a cylinder is hard to ignite. This may lead to an increase in the discharge amount of unburned fuel components. The lower the compression ratio of the internal combustion engine is, the more likely this problem arises.

The present invention has been made in view of the above described problem and has an object to provide a technology that enables control of the discharge amount of unburned fuel components.

According to the present invention, the number of times of execution of sub fuel injection is changed based on the operation range within which the operation state of the internal combustion engine falls in such a way that the lower the engine load of the internal combustion engine is, and the lower the number of engine revolutions of the internal combustion engine is, the more the number of times of execution of sub fuel injection is increased. Furthermore, the lower the atmospheric pressure is, the lower the temperature of the cooling water of the internal combustion engine is, or the lower the temperature of the intake air of the internal combustion engine is, the more an operation range in which the number of times of execution of sub fuel injection is large is expanded to higher loads and higher revolutions.

More specifically, a fuel injection system of a compression ignition internal combustion engine according to the present invention is provided with a fuel injection valve that injects fuel directly into a cylinder of the internal combustion engine, in which sub fuel injection is executed multiple times by the fuel injection valve in addition to main fuel injection at a time earlier than the main fuel injection, and characterized in that:

the system is further provided with number of times changing unit for changing the number of times of execution of sub fuel injection in one combustion cycle based on an operation range within which the operation state of said internal combustion engine falls so that the lower the engine load of said internal combustion engine is, and the lower the number of engine revolutions of said internal combustion engine is, the more the number of times of execution of sub fuel injection in one combustion cycle is increased, and the lower the atmospheric pressure is, the lower the temperature of cooling water of said internal combustion engine is, or the lower the temperature of intake air of said internal combustion engine is, the more an operation range in which the number of times of execution of sub fuel injection in one combustion cycle is large is expanded to higher loads and higher revolutions.

According to the present invention, the operation range that is determined by the engine load and the number of engine revolutions of the internal combustion engine is divided into a plurality of ranges, and the number of times of execution of sub fuel injection is set for each operation range. In addition, the lower the engine load of the internal combustion engine in an operation range is, and the lower the number of engine revolutions of the internal combustion engine in an operation range is, the larger the number of execution of sub fuel injection set for that operation range is.

Thus, when the operation state of the internal combustion engine shifts from an operation range in which the engine load is higher to an operation range in which the engine load is lower, or when the operation state shifts from an operation range in which the number of engine revolutions is higher to an operation range in which the number of engine revolutions is lower, the number of times of execution of sub fuel injection is increased by the number of times changing unit. On the other hand, when the operation state of the internal combustion engine shifts from an operation range in which the engine load is lower to an operation range in which the engine load is higher, or when the operation state shifts from an operation range in which the number of engine revolutions is lower to an operation range in which the number of engine revolutions is higher, the number of times of execution of sub fuel injection is decreased by the number of times changing unit.

Furthermore, according to the present invention, the lower the atmospheric pressure is, the lower the temperature of the cooling water of the internal combustion engine is, or the lower the temperature of the intake air of the internal combustion engine is, the more an operation range in which the number of times of execution of sub fuel injection is large is expanded to higher loads and higher revolutions.

With this feature, the lower the atmospheric pressure is, the lower the temperature of the cooling water of the internal combustion engine is, or the lower the temperature of the intake air of the internal combustion engine is, the larger the number of times of execution of sub fuel injection becomes also in cases where the engine load of the internal combustion engine is higher and in cases where the number of engine revolutions of the internal combustion engine is higher. In consequence, the ignitability of fuel in cases where the atmospheric pressure is low, in cases where the temperature of the internal combustion engine is low, or in cases where the temperature of the intake air of the internal combustion engine is low is improved. Consequently, the discharge amount of unburned fuel components can be controlled.

Furthermore, according to the present invention, the higher the atmospheric pressure is, the higher the temperature of the cooling water of the internal combustion engine is, or the higher the temperature of the intake air of the internal combustion engine is, the more an operation range in which the number of times of execution of sub fuel injection is large is reduced to lower loads and lower revolutions. In consequence, the discharge amount of smoke can be controlled.

In the system according to the present invention, the operation range in which the number of execution of sub fuel injection is largest may be more expanded to higher loads during a specific period since the time at which the internal combustion engine is started than after the specific period has elapsed.

During a period immediately after the start of the internal combustion engine, sharp changes in the engine load of the internal combustion engine may occur in some cases. If the number of times of execution of sub fuel injection is changed repeatedly in a short time with such changes in the engine load of the internal combustion engine, it may become difficult to start the internal combustion engine smoothly.

Here, the specific period is the period until the engine load of the internal combustion engine becomes stable.

According to the above, in the period immediately after the start of the internal combustion engine, the sub fuel injection is likely to be executed the largest number of times stably. In other words, the number of times of execution of sub fuel injection is prevented from being changed repeatedly in a short time during the starting of the internal combustion engine. In consequence, the internal combustion engine can be started smoothly.

The system according to the present invention may further be provided with a common rail that supplies fuel to the fuel injection valve, and pressure changing unit that changes the pressure in the common rail in accordance with the number of times of execution of sub fuel injection. In this case, when the number of times of execution of sub fuel injection in one combustion cycle is decreased or increased by the number of times changing unit with a change in the operation state of the internal combustion engine, the pressure in the common rail is changed by the pressure changing unit.

In connection with this, when the number of times of execution of sub fuel injection is to be decreased by the number of times changing unit, the number of times of execution of sub fuel injection may be decreased after completion of changing of the pressure in the common rail by the pressure changing unit. On the other hand, when the number of times of execution of sub fuel injection is to be increased by the number of times changing unit, the number of times of execution of sub fuel injection may be increased at the same time with the start of changing of the pressure in the common rail by the pressure changing unit.

When the pressure in the common rail is changed, it takes a certain length of time since the changing is started until the actual pressure reaches a target value. In addition, if the pressure in the common rail is the same, the combustion noise is less in the case where the number of times of execution of sub fuel injection is large than in the case where the number of times of execution of sub fuel injection is small.

According to the above, when the number of times of execution of sub fuel injection and the pressure in the common rail are changed, the number of times of execution of sub fuel injection is prevented from becoming insufficient in relation to the pressure in the common rail while the pressure of the common rail is changing. In consequence, an increase in the combustion noise during the change in the pressure in the common rail can be prevented.

Furthermore, misfire is harder to occur in the case where the number of times of execution of sub fuel injection is large than in the case where the number of times of execution of sub fuel injection is small. Therefore, according to the above, misfire is prevented from occurring while the pressure in the common rail is changing.

THE BEST MODE FOR CARRYING OUT THE INVENTION

In the following, specific embodiments of the fuel injection system of a compression ignition internal combustion engine according to the present invention will be described with reference to the drawings.

Embodiment 1

Figure 1:
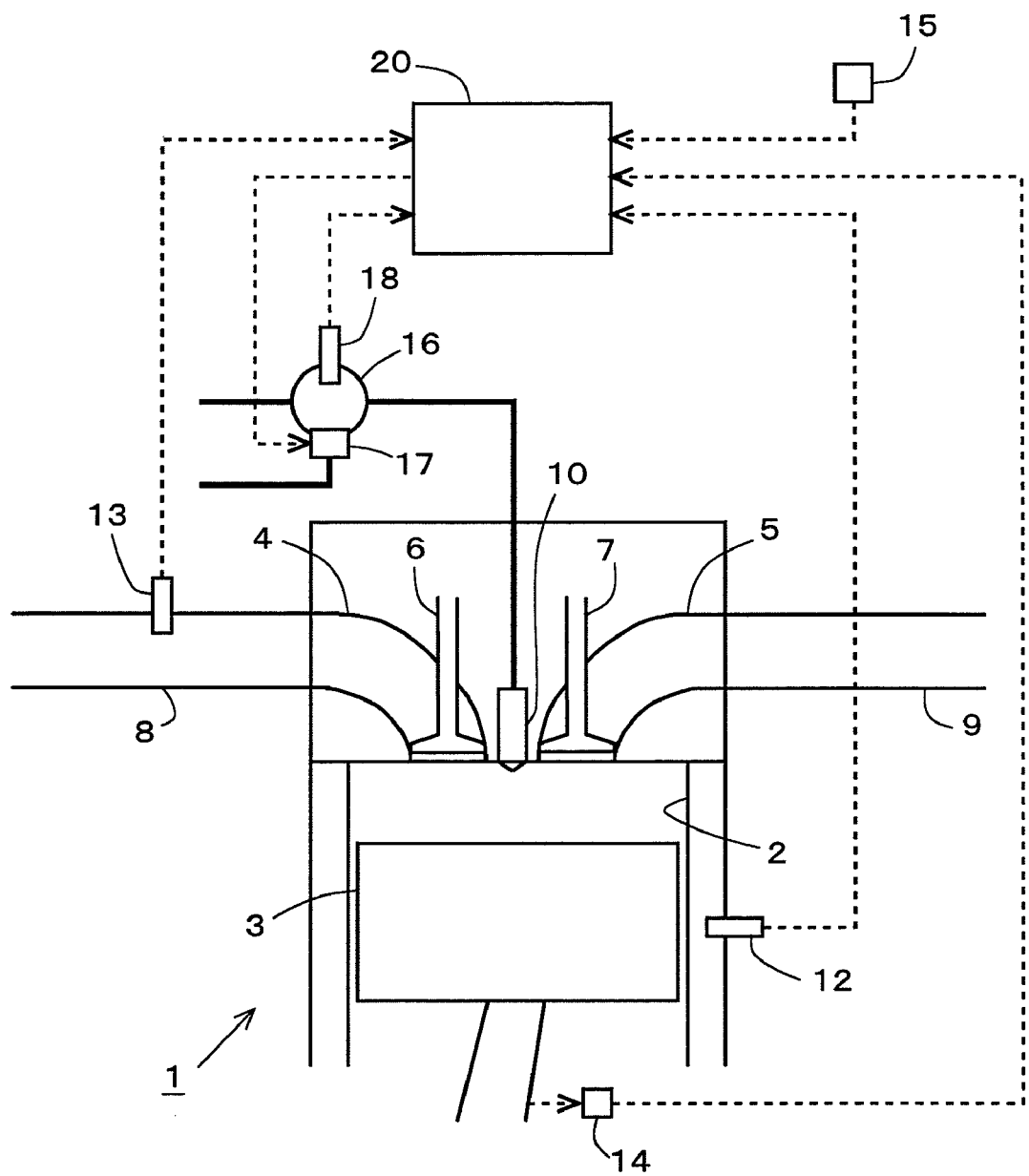
FIG. 1 is a diagram showing the general configuration of an internal combustion engine and its air intake and exhaust system according to embodiment 1.

General Configuration of Air-Intake and Exhaust System of Internal Combustion Engine FIG. 1 is a diagram showing the general configuration of an air-intake and exhaust system of an internal combustion engine according to this embodiment. The internal combustion engine 1 is a compression ignition internal combustion engine having a plurality of cylinders 2 for driving a vehicle. The internal combustion engine 1 according to this embodiment 1 is adapted to have a relatively low compression ratio (e.g. $\epsilon$=14).

A piston 3 is provided in each cylinder 2 of the internal combustion engine 1 in such a way as to be capable of sliding therein. Furthermore, each cylinder 2 is provided with a fuel injection valve 10 that directly injects fuel (or light oil) into a combustion chamber in the upper portion of the cylinder 2. Each fuel injection valve 10 is supplied with fuel from a fuel tank (not shown) through a common rail 16. The common rail 16 is provided with a pressure control valve 17 that controls the pressure in the common rail 16. The common rail 16 is also provided with a common rail pressure sensor 18 that senses the pressure in the common rail 16.

To the combustion chamber of the cylinder 2 are connected an intake port 4 and an exhaust port 5. The openings of the intake port 4 and the exhaust port 5 that lead to the combustion chamber are opened/closed by an intake valve 6 and an exhaust valve 7 respectively. The intake port 4 and the exhaust port 5 are connected respectively to an intake passage 8 and an exhaust passage 9.

The internal combustion engine 1 is provided with a cooling water temperature sensor 12 that senses the temperature of the cooling water, an intake air temperature sensor 13 that senses the temperature of the intake air, and a crank position sensor 14 that senses the crank angle. The vehicle on which the internal combustion engine 1 is mounted is provided with an atmospheric temperature sensor that senses the atmospheric pressure.

To the internal combustion engine 1 having the above-described configuration is annexed an electronic control unit (ECU) 20. The ECU 20 is electrically connected with the cooling water sensor 12, the intake air sensor 13, the crank position sensor 14, the atmospheric pressure sensor 15, and the common rail pressure sensor 18. Output values of them are input to the ECU 20. The ECU 20 calculates the number of engine revolutions of the internal combustion engine 1 based on a detection value of the crank position sensor 14.

The ECU 20 is also electrically connected with the fuel injection valves 10 and the pressure control valve 17. They are controlled by the ECU 20. The ECU 20 controls the pressure in the common rail 16 by means of the pressure control valve 17 to thereby control the fuel injection pressure through the fuel injection valve 10. The ECU 20 also calculates the engine load of the internal combustion engine 1 based on the quantity of fuel injected through the fuel injection valve 10.

<Fuel Injection Control>

In this embodiment, sub fuel injection is executed, in addition to main fuel injection, by the fuel injection valve 10 at a time earlier than the main fuel injection in one combustion cycle. The main fuel injection is executed at a time near the compression stroke top dead center, and the sub fuel injection is executed during the compression stroke. As the sub fuel injection is executed, the temperature in the cylinder 2 rises with cool flame reaction of fuel injected by the sub fuel injection, and kindling is created in the cylinder 2. Therefore, the ignitability of fuel at the time when the main fuel injection is executed is enhanced.

Figure 2:
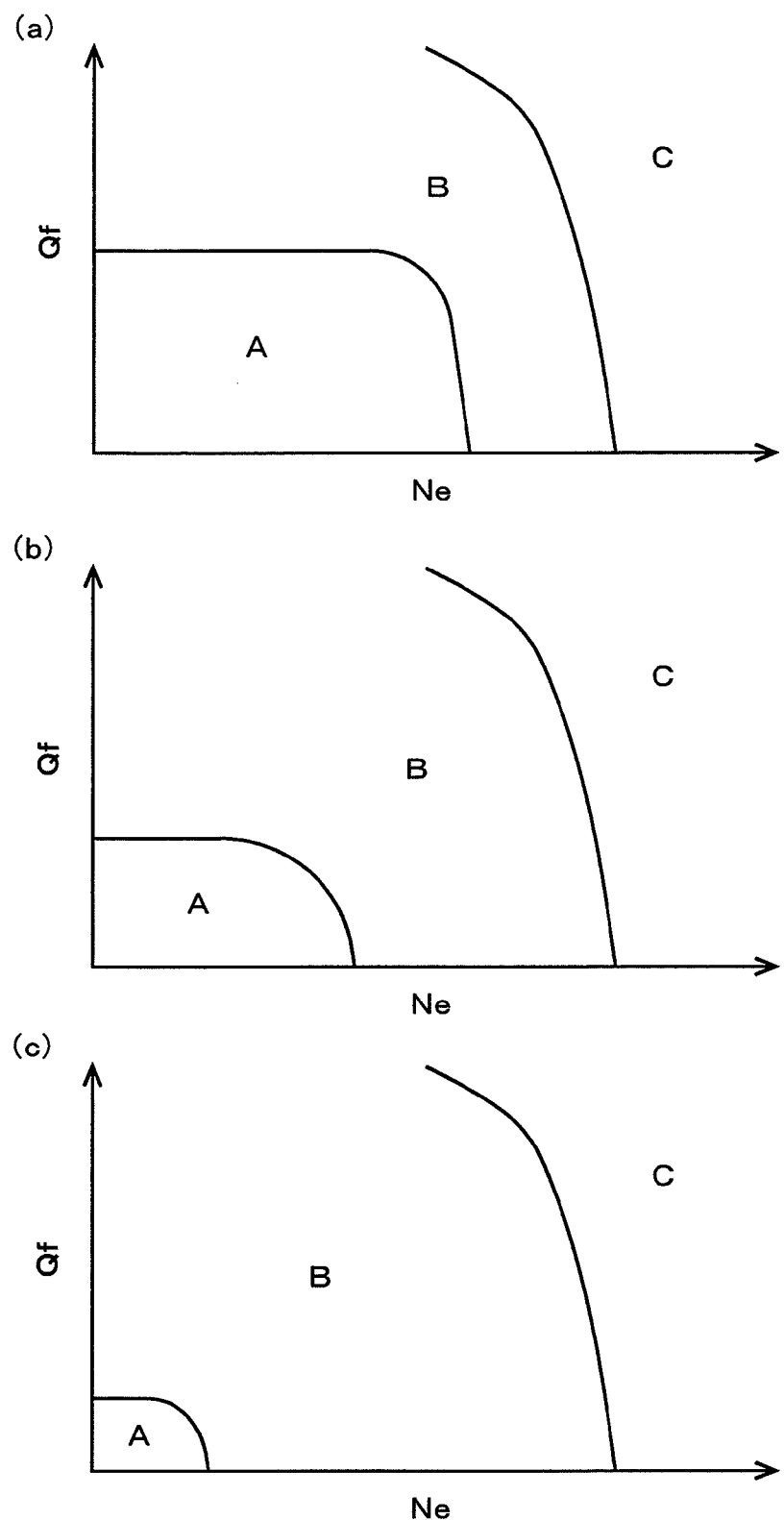
FIG. 2 includes a first map, a second map, and a third map, showing relationships between the operation state of the internal combustion engine and the number of times of execution of sub fuel injection according to embodiment 1.

In this embodiment, the number of times of execution of sub fuel injection is changed based on the operation state of the internal combustion engine 1. Here, a method of setting the number of times of execution of sub fuel injection in this embodiment will be described with reference to FIGS. 2 and 3. In FIG. 2, a first map, a second map, and a third map showing relationships between the operation state of the internal combustion engine 1 and the number of times of execution of sub fuel injection are presented as maps (a), (b), and (c). In the maps (a), (b), and (c) in FIG. 2, the vertical axis represents the engine load Qf of the internal combustion engine 1, and the horizontal axis represents the number of engine revolutions Ne of the internal combustion engine 1. In the maps (a), (b), and (c) in FIG. 2, area A represents the operation range in which the number of times of execution of sub fuel injection is set to 3, area B represents the operation range in which the number of times of execution of sub fuel injection is set to 2, and area C represents the operation range in which the number of times of execution of sub fuel injection is set to 1. These maps shown in FIG. 2 are stored in the ECU 20 in advance.

The lower the engine load Qf of the internal combustion engine 1 is, and the lower the number of engine revolutions Ne of the internal combustion engine 1 is, the harder the fuel in the cylinder 2 is to ignite. In view of this, in this embodiment, as shown in the maps (a), (b), and (c) in FIG. 2, the lower the engine load Qf of the internal combustion engine 1 is, and the lower the number of engine revolutions Ne of the internal combustion engine 1 is, the larger the number of times of execution of sub fuel injection is made.

The larger the number of times of execution of sub fuel injection is, the more the ignitability of the fuel in the cylinder 2 is improved. Therefore, according to the above feature, the ignitability of fuel in cases where the engine load Qf and the number of engine revolutions Ne of the internal combustion engine 1 are low can be improved, whereby the discharge amount of unburned fuel components can be controlled.

Furthermore, according to the above feature, the higher the engine load Qf of the internal combustion engine 1 is, and the higher the number of engine revolutions Ne of the internal combustion engine 1 is, the smaller the number of times of execution of sub fuel injection is made. Therefore, the discharge amount of smoke can also be controlled.

Even if the operation state of the internal combustion engine 1 is the same, the lower the atmospheric pressure is, and the lower the temperature of the internal combustion engine 1 is, the harder the fuel in the cylinder 2 is to ignite. In view of this, in this embodiment, the first map, the second map, and the third map representing different relationships between the operation state of the internal combustion engine 1 and the number of times of execution of sub fuel injection are prepared as shown as (a), (b), and (c) in FIG. 2. Thus, one of these maps is selected based on the atmospheric pressure and the temperature of the cooling water of the internal combustion engine 1, and the number of times of execution of sub fuel injection is set based on the selected map.

Figure 3:
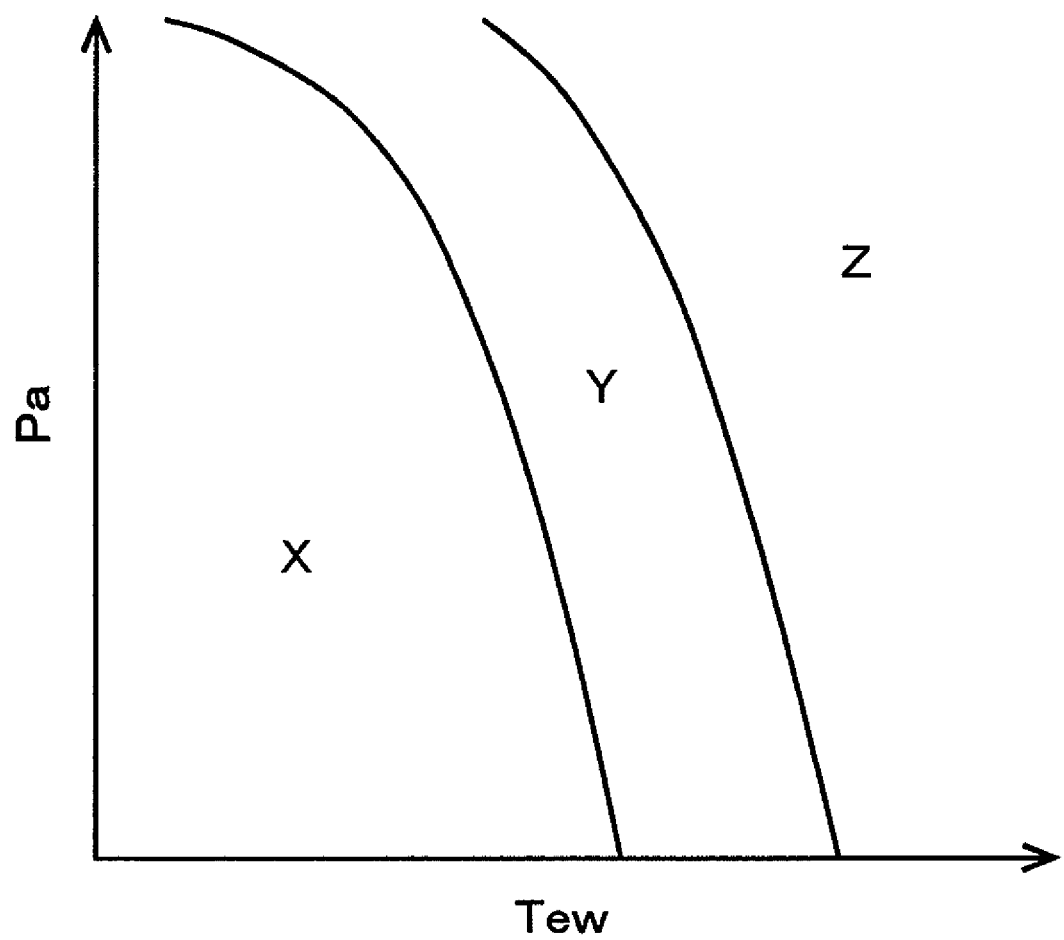
FIG. 3 is a map showing a relationship between the atmospheric pressure, the temperature of the cooling water of the internal combustion engine, and the map to be used to set the number of times of execution of sub fuel injection according to embodiment 1.

FIG. 3 is a map representing a relationship between the atmospheric pressure, the temperature of the cooling water of the internal combustion engine 1, and the maps to be used to set the number of times of execution of sub fuel injection. In FIG. 3, the vertical axis represents the atmospheric pressure Pa, and the horizontal axis represents the temperature Tew of the cooling water of the internal combustion engine 1. In FIG. 3, area X represents the range in which the first map ((a)) shown in FIG. 2 is selected as the map used to set the number of times of execution of sub fuel injection, area Y represents the range in which the second map ((b)) shown in FIG. 2 is selected as the map used to set the number of times of execution of sub fuel injection, and area Z represents the range in which the third map ((c)) shown in FIG. 2 is selected as the map used to set the number of times of execution of sub fuel injection. The map shown in FIG. 3 is stored in the ECU 20 in advance.

As shown in FIG. 2, the operation range A in the second map is expanded to higher loads and higher revolutions than that in the third map, and the operation range A in the first map is further expanded to higher loads and higher revolutions than that in the second map. In the third map, the operation range A may be eliminated, and the range with the lowest load and the lowest revolution may be the operation range B.

As shown in FIG. 3 in the range X in which the atmospheric pressure Pa and the temperature Tew of the cooling water of the internal combustion engine 1 are lowest, the first map shown in FIG. 2 is selected as the map to be used to set the number of times of execution of sub fuel injection, and in the range Z in which the atmospheric pressure Pa and the temperature Tew of the cooling water of the internal combustion engine 1 are highest, the third map shown in FIG. 2 is selected as the map to be used to set the number of times of execution of sub fuel injection. Furthermore, in cases where the atmospheric pressure Pa and the temperature Tew of the cooling water of the internal combustion engine 1 fall within the range Y between the range X and range Z, the second map shown in FIG. 2 is selected as the map to be used to set the number of times of execution of sub fuel injection.

Thus, in this embodiment, the lower the atmospheric pressure Pa is, or the lower the temperature Tew of the cooling water of the internal combustion engine 1 is, the more the operation range A in which the number of times of execution of sub fuel injection is set to 3 is expanded to higher loads and higher revolutions. With this feature, the number of times of execution of sub fuel injection is set to the largest number, or 3 (three), also at higher engine loads Qf of the internal combustion engine 1 and/or at higher numbers of engine revolutions Ne of the internal combustion engine as the atmospheric pressure Pa becomes lower, or the temperature Tew of the cooling water of the internal combustion engine 1 becomes lower.

Therefore, according to this embodiment, the ignitability of fuel in cases where the atmospheric pressure is low or the temperature of the internal combustion engine is low can be improved. In consequence, the discharge amount of unburned fuel components can be controlled.

In this embodiment, the higher the atmospheric pressure Pa is, or the higher the temperature Tew of the cooling water of the internal combustion engine 1 is, the more the operation range A in which the number of times of execution of sub fuel injection is set to 3 is reduced to lower loads and lower revolutions. Therefore, the discharge amount of smoke can also be controlled.

Figure 4:
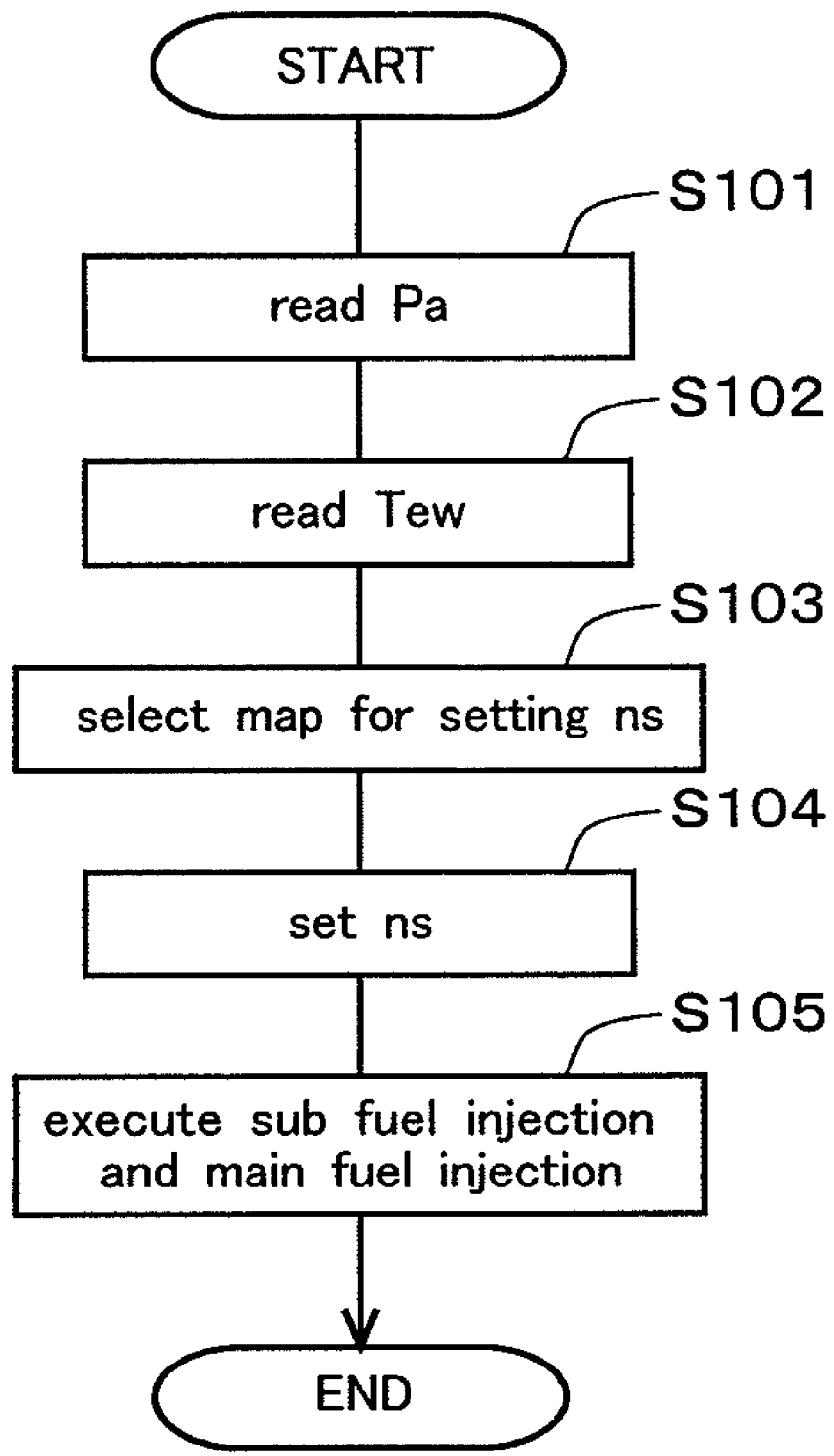
FIG. 4 is a flow chart of a routine of a fuel injection control according to embodiment 1.

Here, a routine of a fuel injection control according to this embodiment will be described with reference to the flow chart shown in FIG. 4. This routine is stored in the ECU 20 in advance and executed repeatedly at predetermined intervals during the operation of the internal combustion engine 1.

In this routine, first in step S101, the ECU 20 reads the atmospheric pressure Pa.

Then, the ECU 20 proceeds to step S102, where it reads the temperature Tew of the cooling water of the internal combustion engine 1.

Then, the ECU 20 proceeds to step S103, where it locates the atmospheric pressure Pa read in step S101 and the temperature Tew of the cooling water of the internal combustion engine 1 read in step S102 in the map shown in FIG. 3 to thereby select a map to be used to set the number of times of execution ns of sub fuel injection from among the first map, the second map, and the third map shown in FIG. 2.

Then, the ECU 20 proceeds to step S104, where it sets the number of times of execution ns of sub fuel injection based on the map selected in step S103. In this embodiment, the ECU 20 that executes this step S104 corresponds to the number of times changing means according to the present invention.

Then, the ECU 20 proceeds to step S104, where it sets the number of times of execution ns of sub fuel injection based on the map selected in step S103. In this embodiment, the ECU 20 that executes this step S104 corresponds to the number of times changing unit according to the present invention.

If the operation state of the internal combustion engine 1 is the same, the lower the temperature of the intake air of the internal combustion engine 1 is, the harder the fuel in the cylinder 2 is to ignite. In view of this, in this embodiment, the horizontal axis of the map shown in FIG. 3 may be the temperature of the intake air of the internal combustion engine 1. In this case, the lower the temperature of the intake air of the internal combustion engine 1 is, the more the operation range A in which the number of times of execution of sub fuel injection is set to 3 is expanded to higher loads and higher revolutions. Thus, the ignitability of fuel in cases where the temperature of the intake air of the internal combustion engine 1 is low can be improved. In consequence, the discharge amount of unburned fuel components can be controlled.

In the above case, the higher the temperature of the intake air of the internal combustion engine 1 is, the more the operation range A in which the number of times of execution of sub fuel injection is set to 3 is reduced to lower loads and lower revolutions. In this case also, the discharge amount of smoke can be controlled.

Embodiment 2

The general configuration of the internal combustion engine and its air intake and exhaust system according to this embodiment is the same as that in embodiment 1.

<Fuel Injection Control>

In this embodiment also, sub fuel injection is executed, in addition to main fuel injection, by the fuel injection valve 10 at a time earlier than the main fuel injection in one combustion cycle, as with embodiment 1.

Figure 5:
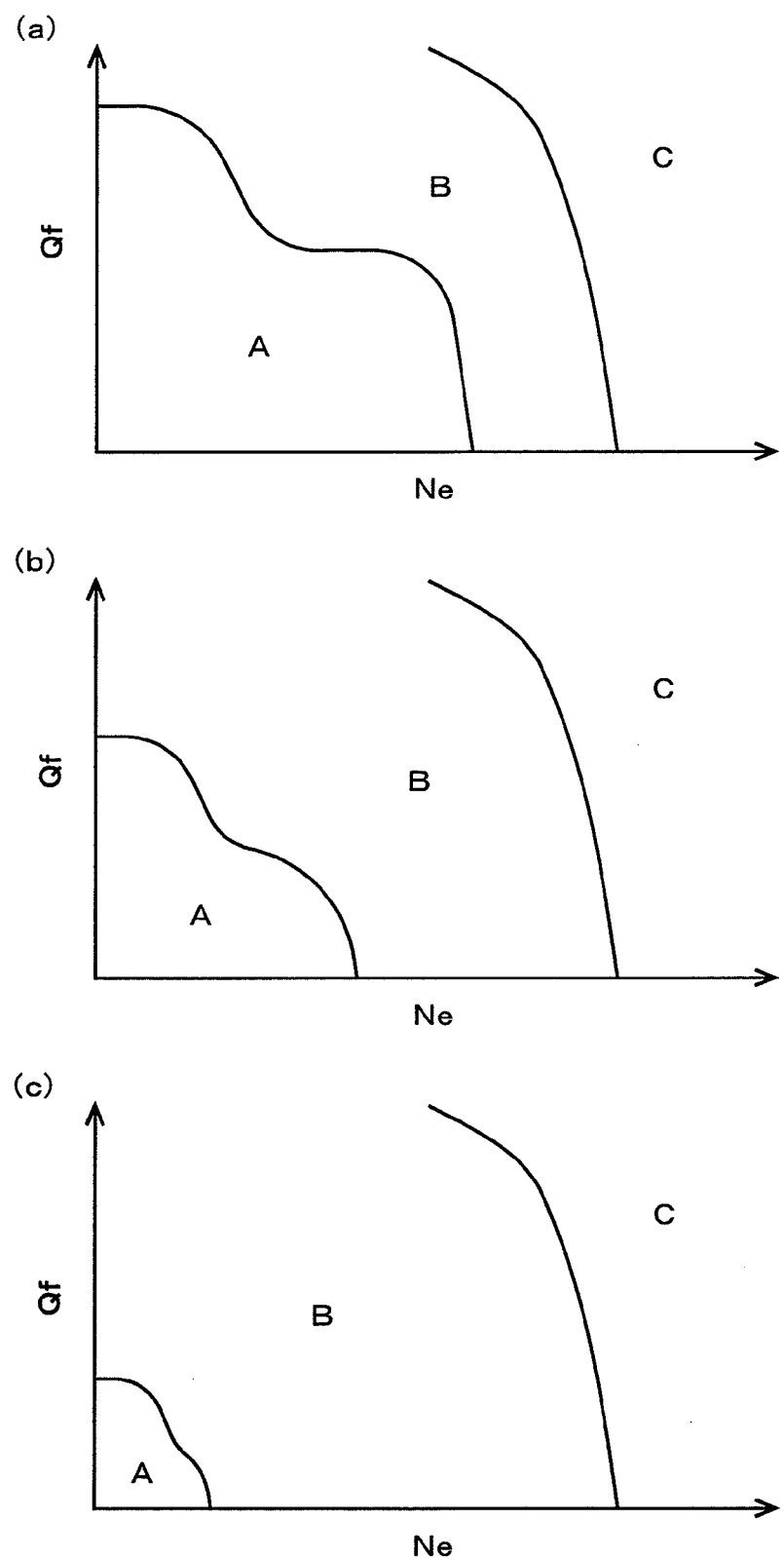
FIG. 5 includes a first map for the time of starting, a second map for the time of starting, and a third map for the time of starting, showing relationships between the operation state of the internal combustion engine and the number of times of execution of sub fuel injection during the starting the internal combustion engine according to embodiment 2.

Here, a method of setting the number of times of execution of sub fuel injection at the time of starting the internal combustion engine 1 according to this embodiment will be described with reference to FIG. 5. In FIG. 5, a first map for the time of starting, a second map for the time of starting, and a third map for the time of starting showing relationships between the operation state of the internal combustion engine 1 and the number of times of execution of sub fuel injection during the starting the internal combustion engine 1 are presented as maps (a), (b), and (c). In the maps (a), (b), and (c) in FIG. 5, the vertical axis represents the engine load Qf of the internal combustion engine 1, and the horizontal axis represents the number of times of engine revolutions Ne of the internal combustion engine 1. In the maps (a), (b), and (c) in FIG. 5, area A represents the operation range in which the number of times of execution of sub fuel injection is set to 3, area B represents the operation range in which the number of times of execution of sub fuel injection is set to 2, and area C represents the operation range in which the number of times of execution of sub fuel injection is set to 1. These maps shown in FIG. 5 are stored in the ECU 20 in advance.

During the starting of the internal combustion engine 1, since the fuel injection quantity is adjusted so that the number of engine revolutions is kept constant, the engine load of the internal combustion engine 1 may change sharply in some cases. In such cases, if one of the first map, the second map, and the third map shown in FIG. 2 is used to set the number of times of execution of sub fuel injection, the operation state of the internal combustion engine 1 may change from a state in the operation range A to a state in the operation range B and vice versa repeatedly, in some cases. In such cases, the number of times of execution of sub fuel injection is changed repeatedly in a short time, which can make it difficult to start the internal combustion engine 1 smoothly.

In view of this, in this embodiment, during a specific period from the time at which the internal combustion engine 1 is started, use is made of the first map for the time of starting, the second map for the time of starting, and the third map for the time of starting shown in FIG. 5 instead of the first map, the second map, and the third map shown in FIG. 2. Specifically, during the specific period from the time at which the internal combustion engine 1 is started, if the atmospheric pressure Pa and the temperature Tew of the cooling water of the internal combustion engine 1 fall within range X in FIG. 3, the first map for the time of starting ((a)) shown in FIG. 5 is selected as the map to be used to set the number of times of execution of sub fuel injection, if the atmospheric pressure Pa and the temperature Tew of the cooling water of the internal combustion engine 1 fall within range Y in FIG. 3, the second map for the time of starting ((b)) shown in FIG. 5 is selected as the map to be used to set the number of times of execution of sub fuel injection, and if the atmospheric pressure Pa and the temperature Tew of the cooling water of the internal combustion engine 1 fall within range Z in FIG. 3, the third map for the time of starting ((c)) shown in FIG. 5 is selected as the map to be used to set the number of times of execution of sub fuel injection.

Here, the specific period is the period until the engine load of the internal combustion engine 1 becomes stable, which is determined in advance by, for example, experiments.

As shown in FIG. 5, the operation range A in the first map for the time of starting, the second map for the time of starting, and the third map for the time of starting is expanded to higher loads as compared to that in the first map, the second map, and the third map shown in FIG. 2. By using one of the first map for the time of starting, the second map for the time of starting, and the third map for the time of starting as such to set the number of times of execution of sub fuel injection, the operation state of the internal combustion engine 1 is apt to fall within the operation range A during a period immediately after the start of the internal combustion engine, and the operation state is prevented from changing from a state in the operation range A to a state in the operation range B and vice versa repeatedly. Therefore, the number of times of execution of sub fuel injection is likely to set to 3 (three) stably. In other words, repetitive changes in the number of times of execution of sub fuel injection in a short time at the time of starting the internal combustion engine 1 are avoided. In consequence, according to this embodiment, the internal combustion engine 1 can be started smoothly.

In this embodiment also, after the lapse of the specific period since the time at which the internal combustion engine 1 is started, the number of time of execution of sub fuel injection is set according to the method same as that in embodiment 1.

Embodiment 3

The general configuration of the internal combustion engine and its air intake and exhaust system according to this embodiment is the same as that in embodiment 1.
<Fuel Injection Control>
In this embodiment also, sub fuel injection is executed, in addition to main fuel injection, by the fuel injection valve 10 at a time earlier than the main fuel injection in one combustion cycle, as with embodiment 1. Furthermore, in this embodiment also, the number of times of execution of sub fuel injection is set according to the method same as that in embodiment 1.

In this embodiment, the pressure in the common rail 16 is changed by the pressure control valve 17 in accordance with the number of times of execution of sub fuel injection. More specifically, the larger the number of times of execution of sub fuel injection is, the higher the pressure in the common rail 16 is made. In this embodiment, the pressure control valve 17 corresponds to the pressure changing unit according to the present invention.

Figure 6:
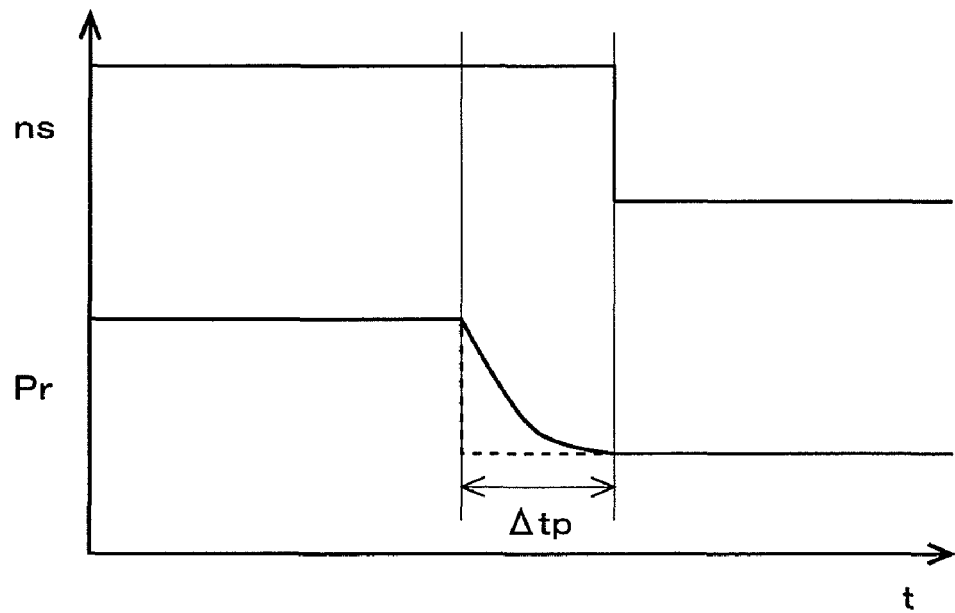
FIG. 6 includes time charts showing the number of times of execution of sub fuel injection and changes in the pressure in the common rail at the time of changing the number of times of execution of sub fuel injection with a change in the operation state of the internal combustion engine according to embodiment 3. Chart (a) in FIG. 6 is for a case in which the number of times of execution of sub fuel injection is decreased, and chart (b) in FIG. 6 is for a case in which the number of times of execution of sub fuel injection is increased.
Figure 6:
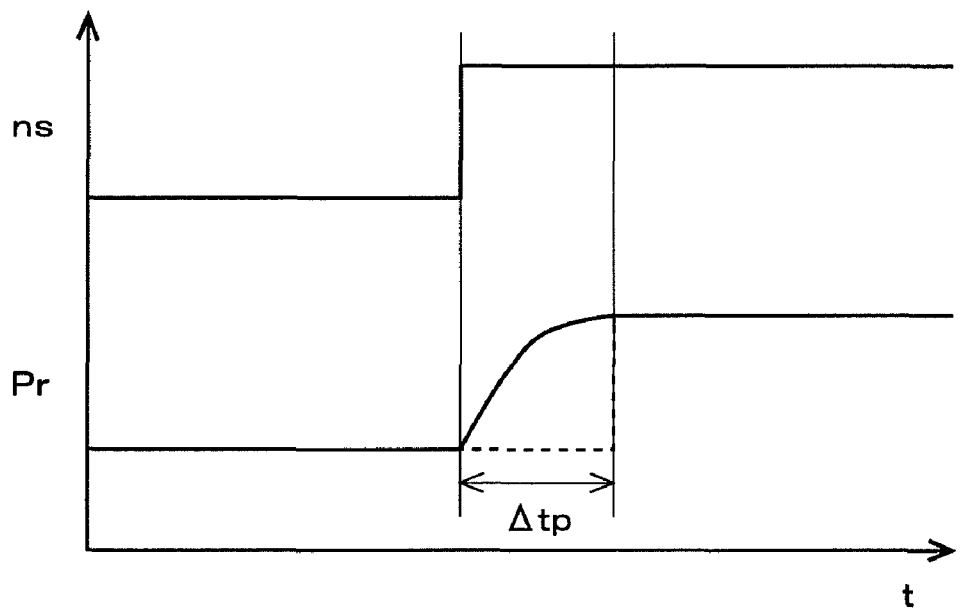

FIG. 6 includes time charts showing the number of times of execution ns of sub fuel injection and changes in the pressure Pr in the common rail 16 at the time of changing the number of times of execution ns of sub fuel injection with a change in the operation state of the internal combustion engine 1. Chart (a) in FIG. 6 is for a case in which the number of times of execution ns of sub fuel injection is decreased, and chart (b) in FIG. 6 is for a case in which the number of times of execution ns of sub fuel injection is increased.

When the pressure Pr in the common rail 16 is changed, it takes a certain length of time since the changing is started until the actual pressure Pr reaches a target value, as shown in charts (a) and (b) in FIG. 6. In other words, there is a response delay period Δtp. In addition, if the pressure Pr in the common rail 16 is the same, the combustion noise is less in the case where the number of times of execution ns of sub fuel injection is large than in the case where the number of times of execution ns of sub fuel injection is small.

In view of the above, in this embodiment, in cases where the number of times of execution ns of sub fuel injection is to be decreased, changing of the pressure Pr in the common rail 16 is started prior to decreasing the number of times of execution ns of sub fuel injection, as shown in chart (a) in FIG. 6. Then, the number of times of execution ns of sub fuel injection is decreased after the actual pressure Pr has reached a target value associated with the number of times of execution ns of sub fuel injection after the decrease (i.e. after the response delay period Δtp has elapsed since the time at which the changing of the pressure Pr in the common rail 16 was started).

On the other hand, in cases where the number of times of execution ns of sub fuel injection is to be increased, the number of times of execution ns of sub fuel injection is increased at the same time with the start of changing of the pressure Pr in the common rail 16, as shown in chart (b) in FIG. 6.

According to the above, when the number of times of execution ns of sub fuel injection and the pressure Pr in the common rail 16 are changed, the number of times of execution ns of sub fuel injection is prevented from becoming insufficient in relation to the pressure Pr in the common rail 16 during the changing of the pressure Pr of the common rail 16 (i.e. during the response delay period Δtp). In consequence, an increase in the combustion noise during the change in the pressure Pr in the common rail 16 can be prevented.

Figure 7:
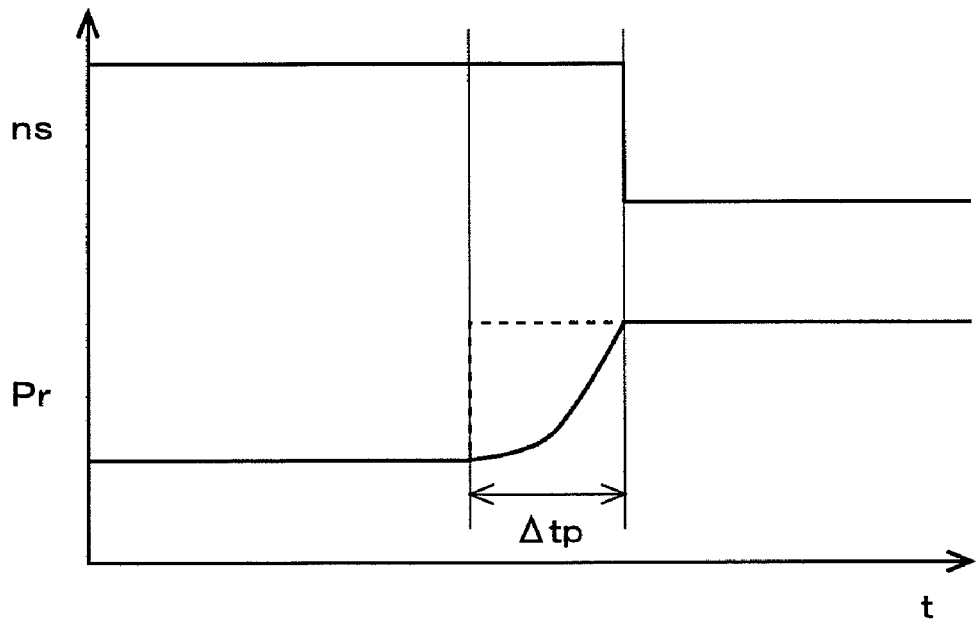
FIG. 7 includes time charts showing the number of times of execution of sub fuel injection and changes in the pressure in the common rail at the time of changing the number of times of execution of sub fuel injection with a change in the operation state of the internal combustion engine according to a modification of embodiment 3. Chart (a) in FIG. 7 is for a case in which the number of times of execution of sub fuel injection is decreased, and chart (b) in FIG. 7 is for a case in which the number of times of execution of sub fuel injection is increased.
Figure 7:
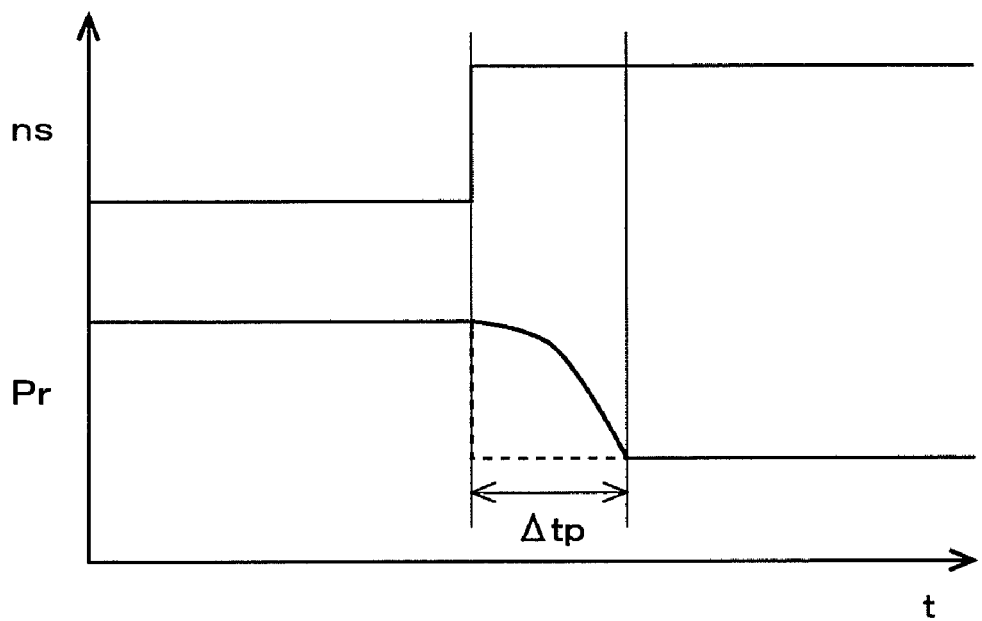

Furthermore, misfire is harder to occur in the case where the number of times of execution ns of sub fuel injection is large than in the case where the number of times of execution ns of sub fuel injection is small. Therefore, according to the present invention, misfire is prevented from occurring while the pressure Pr in the common rail 16 is changing.
<Modification>
Here, a modification of this embodiment will be described. In this modification, the larger the number of times of execution of sub fuel injection is, the lower the pressure in the common rail 16 is made. FIG. 7 includes time charts showing the number of times of execution ns of sub fuel injection and changes in the pressure Pr in the common rail 16 at the time of changing the number of times of execution ns of sub fuel injection with a change in the operation state of the internal combustion engine 1. Chart (a) in FIG. 7 is for a case in which the number of times of execution ns of sub fuel injection is decreased, and chart (b) in FIG. 7 is for a case in which the number of times of execution ns of sub fuel injection is increased.

In this modification also, in cases where the number of times of execution ns of sub fuel injection is to be decreased, changing of the pressure Pr in the common rail 16 is started prior to decreasing the number of times of execution ns of sub fuel injection, as shown in chart (a) in FIG. 7. Then, the number of times of execution ns of sub fuel injection is decreased after the actual pressure Pr has reached a target value associated with the number of times of execution ns of sub fuel injection after the decrease (i.e. after the response delay period $\Delta tp$ has elapsed since the time at which the changing of the pressure Pr in the common rail 16 was started). On the other hand, in cases where the number of times of execution ns of sub fuel injection is to be increased, the number of times of execution ns of sub fuel injection is increased at the same time with the start of changing of the pressure Pr in the common rail 16, as shown in chart (b) in FIG. 7.

According to the above, in the case where the larger the number of times of execution ns of sub fuel injection is, the lower the pressure Pr in the common rail 16 is made also, an increase in the combustion noise and the occurrence of misfire can be prevented while the pressure Pr in the common rail 16 is changing at the time of changing the number of times of execution ns of sub fuel injection.

Although in the above-described embodiments, the description has been made of cases where the number of times of execution of sub fuel injection in one combustion cycle is set to 1, 2, or 3, the number of times is not limited to these numbers.

The above-described embodiments may be applied in combination if possible.

INDUSTRIAL APPLICABILITY

According to the present invention, the discharge amount of unburned fuel components of an internal combustion engine can be controlled.

The invention claimed is:

1. A fuel injection system of a compression ignition internal combustion engine provided with a fuel injection valve that injects fuel directly into a cylinder of the internal combustion engine, in which sub fuel injection is executed multiple times by the fuel injection valve in addition to main fuel injection at a time earlier than the main fuel injection, wherein the system comprises:

a number of times changing unit which changes the number of times of execution of sub fuel injection in one combustion cycle based on an operation range within which the operation state of said internal combustion engine falls so that the lower the engine load of said internal combustion engine is, and the lower the number of engine revolutions of said internal combustion engine is, the more the number of times of execution of sub fuel injection in one combustion cycle is increased;

a common rail that supplies fuel to said fuel injection valve; and a pressure changing unit which changes the pressure in said common rail in accordance with the number of times of execution of sub fuel injection in one combustion cycle, wherein the lower the atmospheric pressure is, the lower the temperature of cooling water of said internal combustion engine is, or the lower the temperature of intake air of said internal combustion engine is, the more an operation range in which the number of times of execution of sub fuel injection in one combustion cycle is large is expanded to higher loads and higher revolutions, and wherein, if the number of times of execution of sub fuel injection in one combustion cycle is to be decreased by said number of times changing unit, then said pressure changing unit starts changing the pressure in said common rail, and said number of times changing unit starts the decrease in the number of times of execution of sub fuel injection only after a specific period has elapsed, wherein said specific period is determined to correspond to a response delay period beginning with the start of the changing of the pressure in said common rail and ending when said pressure changing unit completes the changing of the pressure in said common rail to a target value corresponding to the decreased number of times of execution of sub fuel injection.

2. A fuel injection system of a compression ignition internal combustion engine according to claim 1, wherein, if the number of times of execution of sub fuel injection in one combustion cycle is to be decreased by said number of times changing unit, then said number of times changing unit starts the decrease in the number of times of execution of sub fuel injection only after said pressure changing unit completes the changing of the pressure in said common rail to the target value, and wherein, if the number of times of execution of sub fuel injection in one combustion cycle is to be increased by said number of times changing unit, then said number of times changing unit starts the increase in the number of times of execution of sub fuel injection at the same time when said pressure changing unit starts changing the pressure in said common rail to a second target value corresponding to the increased number of times of execution of sub fuel injection.

* * * * *